United States Patent [19]

Anderson et al.

[11] Patent Number: 5,845,152

[45] Date of Patent: Dec. 1, 1998

[54] METHOD FOR TRANSMISSION OF ISOCHRONOUS DATA WITH TWO CYCLE LOOK AHEAD

[75] Inventors: Eric Werner Anderson, Cupertino; Michael K. Eneboe, San Jose; Rahoul Puri, Sunnyvale; Erik P. Staats, Brookdale, all of Calif.

[73] Assignee: Apple Computer, Inc., Cupertino, Calif.

[21] Appl. No.: 828,831

[22] Filed: Mar. 19, 1997

[51] Int. Cl.$^6$ ........................................ G06F 13/00
[52] U.S. Cl. .......................... 395/872; 395/885; 395/580; 395/200.64; 395/202.8
[58] Field of Search ..................................... 395/872, 873, 395/874, 875, 876, 888, 580–587; 370/398, 312; 371/49.1; 398/205.26, 200.8

[56] References Cited

U.S. PATENT DOCUMENTS

| | | | |
|---|---|---|---|
| 5,521,928 | 5/1996 | Worsley et al. | 370/372 |
| 5,640,392 | 6/1997 | Hayashi | 370/395 |
| 5,668,948 | 9/1997 | Belknap et al. | 395/200.61 |
| 5,678,312 | 10/1997 | Graziano et al. | 395/200.2 |
| 5,727,233 | 3/1998 | Lynch et al. | 395/885 |
| 5,742,623 | 4/1998 | Nuber et al. | 371/47.1 |
| 5,758,075 | 5/1998 | Graziano et al. | 395/200.8 |

*Primary Examiner*—Christopher B. Shin
*Attorney, Agent, or Firm*—Mark A. Aaker

[57] ABSTRACT

A method for the loading and unloading of a FIFO in an isochronous transmission mechanism uses descriptor blocks which have both branch addresses and skip addresses. The method can recover from cycle loss by selectively resending or skipping a packet that should have been sent in the lost cycle. The method also works two cycles ahead of schedule, in an attempt to keep the FIFO loaded with all of the packets for two cycles of transmission. The FIFO is filled according to a DMA algorithm and drained according to a Link algorithm where the two algorithms are coordinated to communicate information about lost cycles and current demands or opportunities for transmission. If the Link algorithm detects a lost cycle, it communicates that to the DMA algorithm and the DMA algorithm seeks to compensate appropriately. These two algorithms describe mechanisms for the DMA and Link sides of an isochronous transmitter. Working in parallel, these two units can transmit isochronous packets on a serial bus, with two-cycle workahead, while supporting various recovery mechanisms for dealing with cycle loss. Each of the isochronous channels being transmitted by this system can use the recovery mechanisms, chosen as appropriate to best satisfy application-specific requirements.

2 Claims, 5 Drawing Sheets

METHOD FOR TRANSMISSION OF ISOCHRONOUS DATA WITH TWO CYCLE LOOK AHEAD

FIELD OF THE INVENTION

This invention pertains to managing an isochronous data transmitter to maintain a steady flow of data. More particularly, this invention pertains to managing the contents of a buffering unit such as a FIFO so as to keep two transmission cycles worth of data in the FIFO whenever possible.

BACKGROUND OF THE INVENTION

Consumer, business, and professional equipment for computation, communication, and entertainment have all adopted high speed serial bus technology for data transfer between devices. Serial bus standards that have been widely adopted include IEEE 1394 High Performance Serial Bus, and Universal Serial Bus. To support the transfer of digital data including, but not limited to, audio, video, and still images, serial busses may employ an isochronous transfer mode. Isochronous transfer ensures that data arrives on schedule, even when multiple tasks are competing for access to the same serial bus. Isochronous transfer allows the smooth, unbroken movement or display of digital data.

This invention describes an algorithm employed in the transmission of isochronous data on a serial bus. For purposes of example, the IEEE 1394 High Performance Serial Bus will be used, but the techniques described can be applied to other serial busses and other forms of digital communication, such as Asynchronous Transfer Mode networks, and other networks and communication systems. The IEEE 1394-1995 standard was adopted on Dec. 12, 1995 by the Institute of Electrical and Electronic Engineers, 345 East 47th Street, New York, N.Y. 10017-2394. A copy of that standard is available from the IEEE. The standard is widely known in the industry of digital video, particularly since IEEE-1394-1995, also known as FireWire™ (trademark of Apple Computer, Inc., Cupertino, Calif. 95014), has been adopted as the standard for connecting digital video cameras and other digital video devices in the consumer and professional markets. The contents of that standard are incorporated herein by reference (IEEE 1394 Specification).

It is helpful in a 1394 system to include a host controller interface. In a preferred embodiment, that interface is the 1394 Open Host Controller Interface, currently being refined and finalized by several groups of engineers from companies including Apple Computer, Inc. A copy of the 0.92 draft of the O-HCI Specification which was modified and released Mar. 6, 1997, is enclosed with this application and is incorporated herein by reference, at least to the extent needed. The contents of this specification are well understood by at least a number of participants on the committee reviewing and revising this specification, and the specification is widely available and under review by many engineers at many companies throughout the world. The description that follows is background on the function of IEEE 1934 communications, described in considerable detail in the available specifications and well known to one skilled in the art.

Figure 1:
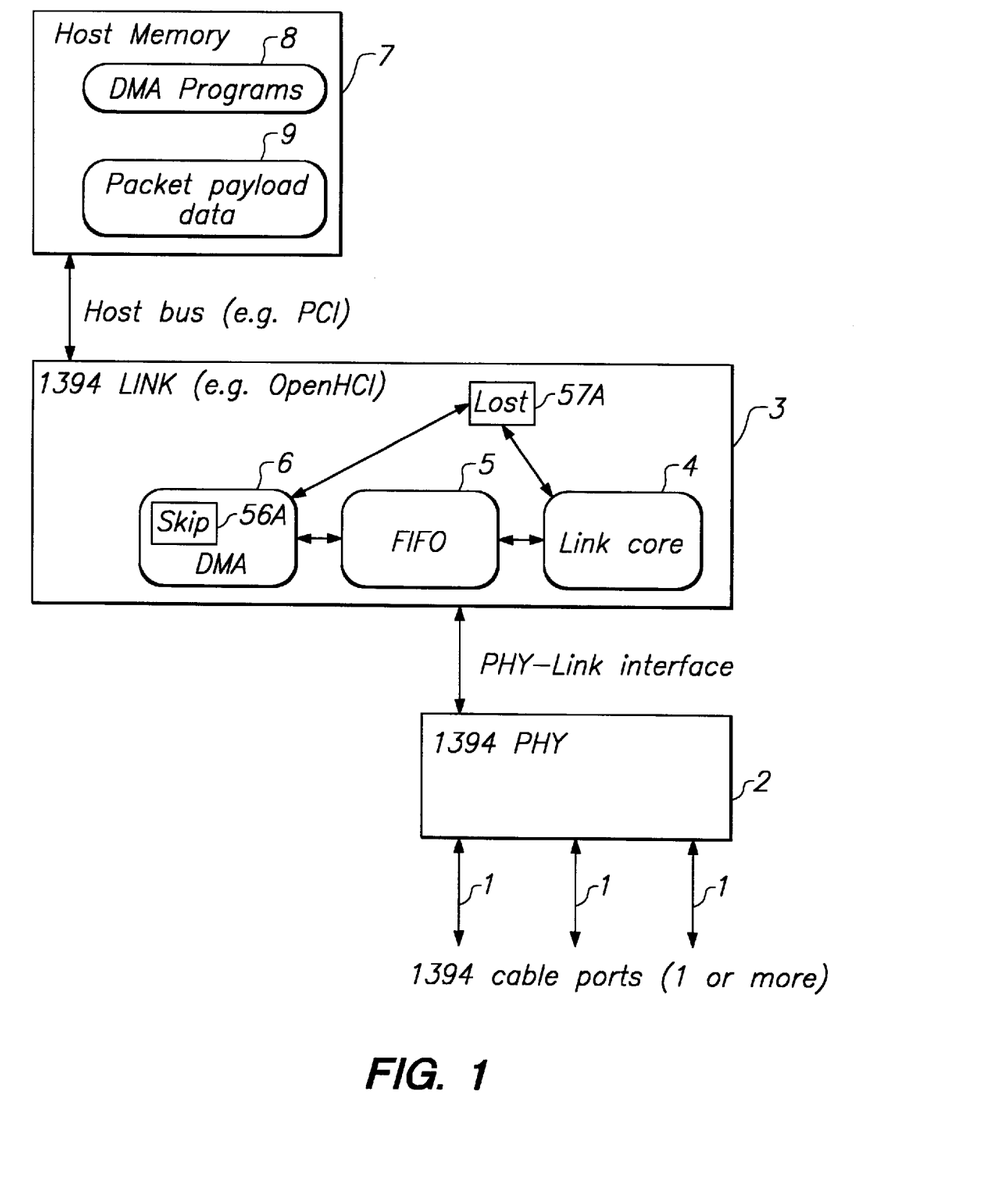
FIG. 1 illustrates a general architecture of a system which can benefit from the present method, including a block diagram of major 1394 Link and PHY component used in isochronous transmit operations.

One view of a typical architecture is illustrated in FIG. 1. Referring to FIG. 1, one or more external cables 1 each connect through a corresponding port to 1394 PHY device 2, which in turn is linked to 1394 link device 3. Inside 1394 link device 3, a link core 4 takes data from FIFO 5 and puts it out over 1394 PHY device 2. DMA unit 6 works with host memory 7 to execute one or more DMA programs 8 and to access packet payload data 9 according to a DMA program to move that payload data over the host bus to FIFO 5 for subsequent transmission. This general architecture is familiar to one skilled in the art. The new invention, however, uses this same basic architecture and improves the DMA unit 6 and the link core 4.

In communication systems such as IEEE 1394, isochronous data transfer is performed using a master clock. All isochronous transmission on such a serial bus occurs according to synchronization signals from the master clock. When isochronous transfer is used, one node on and IEEE 1394 serial bus must assume the role of the "cycle master". Every 125 microseconds, the cycle master attempts to send a special packet on the serial bus called a "cycle start" as soon as possible. The cycle start packet may be delayed if the bus is already in use, but, on average, they will be spaced 125 microseconds apart. The arrival (or transmission) of the cycle start packet indicates that it is time for some nodes that are participating in isochronous transfer to attempt to send some isochronous data.

Figures 2, 4, 7:
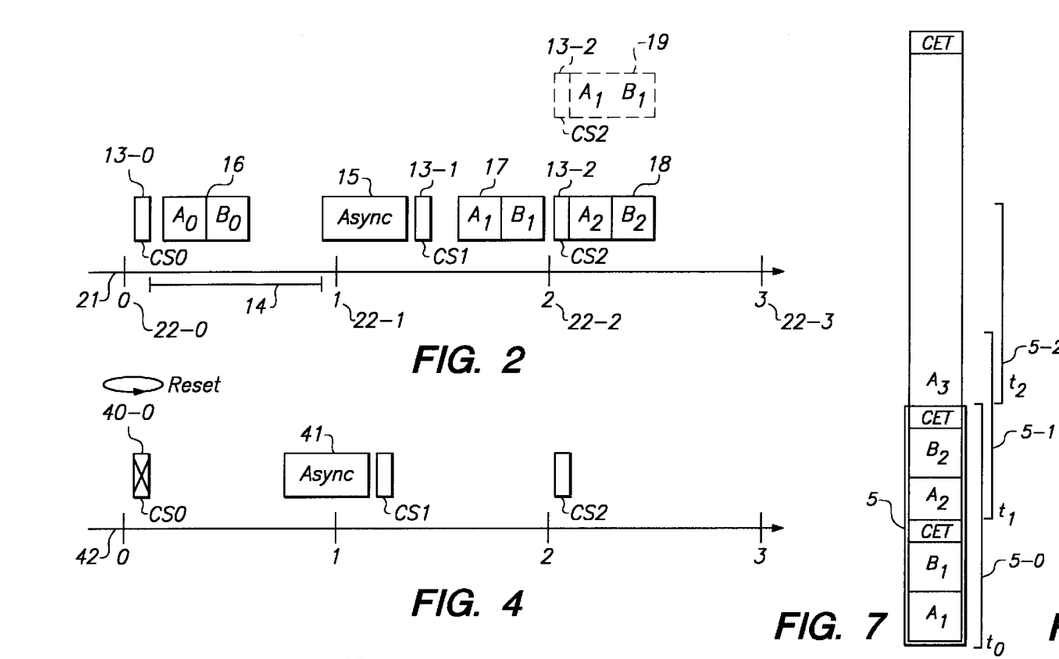
FIG. 2 illustrates a typical isochronous packet transmission sequence.
FIG. 4 illustrates a timeline for a second, typical transmission sequence.
FIG. 7 illustrates representative contents of the FIFO at selected times.

Referring to FIG. 2, a time line 21 is shown including clock times 22 (cycles 0, 1, 2, 3 shown). Cycle start 0 13-0 ("CS0") is illustrated as occurring shortly after time 0. An isochronous period 14 of up to 100 μsec follows the cycle start 13-0. Isochronous packets such as the AOBO pair 16 illustrated can be sent during this isochronous period. Depending on how much time may remain after an isochronous period, one or more pending asynchronous packets 15 can be sent over the serial bus. Since such packets do not operate within the constraints placed on isochronous packets, they can pass over a cycle boundary and complete at some point in the following cycle. When all transmissions from the previous cycle have completed, the cycle master can issue the next cycle start, here 13-1, occurring some time after 22-1, the intended start of cycle 1. Note that a full cycle still occurs, even though it started late. Assuming no transmissions require more than the time remaining in this cycle, the subsequent cycle start 13-2 is issued shortly after cycle period 2 is due to begin.

Zero, one, or several nodes on a serial bus may intend to transmit isochronous data following the cycle start packet. The order in which the nodes are allowed to transmit data may vary, and may be determined randomly, but typically according to an arbitration scheme with bus requests and bus grants. When a node receives permission to transmit, the node must begin transmission immediately. Because the various subsystems within a node, such as a CPU and memory system, may have unpredictable data access latencies, it may be necessary for the serial bus interface to prepare for transmission in advance, so that it can reliably transmit isochronous data when it receives permission, without any delay. This preparation typically involves loading the data to be transmitted into a special memory organized as a FIFO. The contents of the FIFO can be transmitted on the serial bus without making use of any of the other subsystems within a node. Therefore, if the data to be transmitted is in the FIFO, transmission can begin at any time.

If the data to be transmitted cannot be made available in time for transmission, transmission of that packet will fail and the system will need to decide how to recover. It is possible for a portion of a data packet to be loaded into a FIFO by the time transmission begins and for the preparation side of the device to continue to move data from memory into the FIFO even as the FIFO is being unloaded via transmission. This situation is sometimes referred to as "hand to mouth" transmission. It is quite possible for transmission of such packets to complete successfully but there is less tolerance for delay or errors on the DMA side in filling the FIFO. However, if only some of the packet has been sent and the data in the FIFO runs out, then the transmission of that packet will fail.

Because the order of isochronous transmissions on a serial bus can vary, it is possible for a single node to receive permission to transmit, and to then immediately receive permission to transmit again. Commonly this may occur if the node gets a bus grant late in one transmission cycle and very early, e.g. first, in the following cycle. In FIG. 2, see packet pair A1B1 17 late in time period 1 and packet pair A2B2 18 very early in cycle 2 (just after CS2 13-2). Because these events happen consecutively, the greatest chance of successful transmission will result if the node has prepared two packets of data in the FIFO ahead of time.

A serial bus such as IEEE 1394 can support multiple isochronous channels. In such a case, for each active channel, one packet may be transmitted in each isochronous cycle. An isochronous cycle is the period of time between cycle start packets. It is possible that a single node will be transmitting data on multiple isochronous channels. In this case, it is possible that the node will receive permission to transmit all of its channels for one cycle, and then immediately receive permission again to transmit all of its channels for the next cycle. See packet pairs 17, 18 in FIG. 2. As described previously, the greatest chance of success is obtained if all packets for both cycles are loaded into the FIFO before permission is received to begin transmitting on the first cycle.

During isochronous transmission, it is possible that a cycle start packet will be lost. Referring to FIG. 4, timeline 45 shows the start of time cycles 0, 1 and 2. Cycle Start packet CS0 40-0 is normally transmitted shortly after time 0, the beginning of that cycle, but may be lost. This loss can happen due to several causes, including a reset of the serial bus, or a CRC error within the cycle start packet. In such a case, the cycle start packet is not seen by some or all nodes on the bus. This event is known as a cycle loss. Nodes intending to transmit isochronous data on a lost cycle will be unable to do so, because they will never see the cycle start packet for that cycle. Asynchronous packets such as packet 41, however, may still be sent even starting during a lost cycle.

Nodes may recover from cycle loss in at least two ways. A node could ignore the cycle loss, and continue to send isochronous data in response to each cycle start packet. The data flow would continue, but each packet would be transmitted one cycle later than was intended. If multiple cycle losses occur, the transmitted data will fall further and further behind schedule. This slippage may cause errors to occur in other components of the system, because data is not being delivered on time. A second recovery method is to skip packets that had been scheduled for transmission, in order to send the subsequent packets according to the original schedule. This method will cause some isochronous data to be lost, but will not cause a gradual slippage of the transmission schedule. The discussion above with regard to FIG. 3 illustrates ways to select a response to lost cycles using the skip address value for each packet of data.

In the host interfaces for serial busses such as IEEE 1394, a DMA program is commonly used to control the transmission of packets. For isochronous transmission, such a program may contain a series of packet descriptors. Each descriptor is a set of control data that defines the contents of a single packet that is to be transmitted. The descriptors are linked together in a list, and one descriptor is processed for each isochronous cycle. The descriptor describes a packet that will be transmitted during that cycle. Some DMA systems use multiple descriptors to describe a single packet. Such a set of descriptors is known as a descriptor block. See, generally, Sections 1.3, 3 and 9 of the O-HCI specification.

A descriptor block for one packet may contain a link to a descriptor block for the packet that is to follow it. If an isochronous transmission system allows an option to use either of the two cycle loss recovery methods previously described, this option may take the form of an alternate link in each descriptor that is to be followed when a cycle loss occurs. Such a link is known as a "skip address", while the link that is applied when no cycle loss occurs is known as a "branch address".

Figure 3:
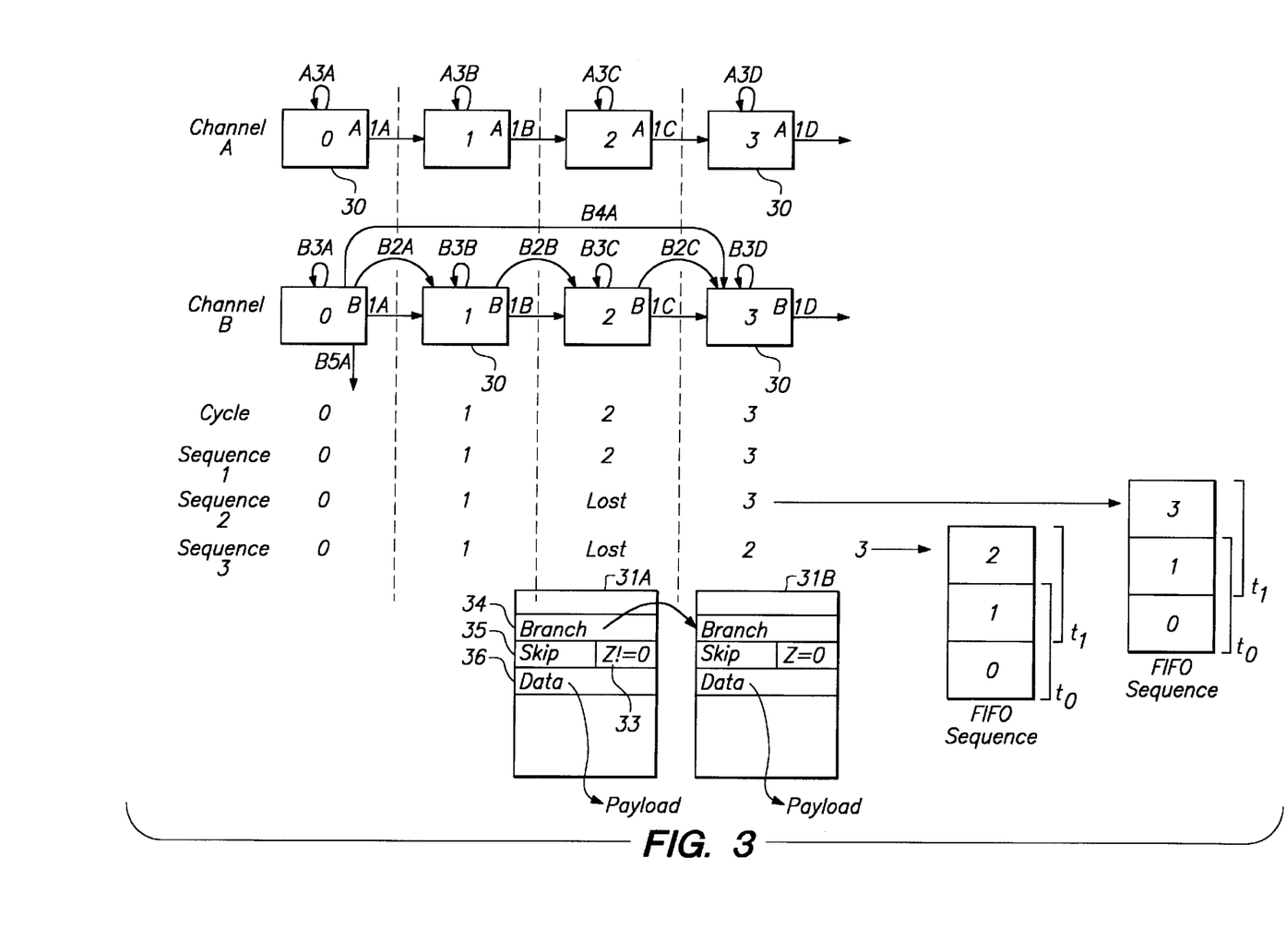
FIG. 3 illustrates packets in two different contexts, DMA command packets, and the contents of the FIFO in representative sequences.

Referring to FIG. 3, packets 30 are shown in each of channel A and channel B. In Channels A and B, packets 30 are numbered 0, 1, 2 and 3 to illustrate the order in which they are to be sent and the preferred alignment with clock cycles 0, 1, 2 and 3. In general, the cycles are to be sent in order unless there is a failure such as a lost cycle or failed transmission. The cycles preferably are sent at a desired time. Using the options available under IEEE 1394 and under the 1394 O-HCI, isochronous packets can be synchronized for sending in a specific cycle, in a specific order, or according to a wide variety of schemes. Section 3 of the O-HCI Specification details the organization of packets for DMA transmission. A ContextControl register allows the host controller to fetch and process descriptors for a given context or channel. Various specific bits in that register are useful in controlling the transmission process.

DMA command descriptors 31A and 31B are typical for directing transmission of isochronous DMA packets. See generally O-HCI specification, section 9. These DMA command descriptors include a branch address 34 to indicate the address of the next packet that should be sent, and a skip address 35 to indicate the address of the next packet that should be sent in case a packet transmission fails. For example, the branch address for a packet (not shown) corresponding to packet 30 in cycle 0 and channel A may be A1A and point to packet 30 in cycle 1 of channel A. Corresponding branch addresses A1B and A1C point to the corresponding next packets in order of desired transmission, and A1D continues this pattern, pointing to a subsequent packet (not shown). If transmission is successful, this is the programmed sequence of packets to send. The skip address, on the other hand, provides information on which packet to send if transmission fails. In FIG. 3, channel A, the skip address for the DMA command descriptor (not shown) corresponding to packet 30 in cycle 0 and channel A may be A3A, which points back to the packet in cycle 0. This means that if transmission of the packet in cycle 0 is not possible, the system should attempt to resend that same packet until successful. This pattern is typical of transmissions where every piece of data is essential, such as in file transfer or in a print stream directed to a printer. Corresponding skip instructions in subsequent packets for cycles 1, 2, and 3 are shown as A3B, A3C and A3D, each indicating that each such packet is to be sent without failure.

A similar pattern is seen in channel B. Channel B also indicates some alternative skip modes. For example, the addresses in sequence B2A, B2B, B2C might be stored as skip address values for DMA command descriptor 31A corresponding to cycles 0, 1 and 2 to indicate that if transmission of a packet fails then the system should move on to the next packet. This pattern is useful if the data contents are time sensitive and it is more important to maintain time alignment than to send every single data element. Transmission of a video image for a monitor might be usefully ordered in this way, since loss of data from time to time might show up as an artifact, dropped frame and the like, but the remaining data will have a chance to be transmitted in a timely manner. Transmission of a voice communication, as in a telephone conversation or radio-like broadcast, also would be appropriate for this mode of communication. The sequence B3A, B3B, etc. is similar to that described for Channel A. The skip instruction B4A shows yet another alternative where the skip is to a selected, other packet, shown here for example as skipping ahead to packet 3. Such a skip might well be coupled with an instruction to not transmit the packet 30 in cycle 3 until a set time or synchronization value. Such a sequence might be useful for example in transmitting an MPEG sequence where loss of an intermediate frame will make succeeding frames useless until the next key frame is available. Still another skip instruction B5A simply terminates the sequence in the case of a cycle loss. In general, only one skip address value can be included with a single packet but a variety of skip patterns can be used.

By way of example, packet sequence 1 is the preferred order and timing for transmitting packets from either channel A or B. Packet sequence 2 shows one potential sequence where the skip instruction points to the next packet in sequence, e.g. B2A, B2B, B2C for channel B, where the cycle of time 2 is lost and no packet can be sent in that time. The next packet sent is packet 3, as illustrated in the partial FIFO contents. Packet sequence 3 shows another potential sequence where the skip instruction points back to the same packet, e.g. B3A, B3B, B3C, B3D or A3A, A3B, A3C, etc., where the cycle of time 2 is lost and no packet can be sent in that time. The next packet sent is packet 2, as illustrated in the corresponding partial FIFO contents. The brackets indicate the approximate contents of the FIFO at time 0 ($t_0$) and time 1 ($t_1$). Note that the filling and emptying of the FIFO is dynamic so FIFO may contain only some of the indicated data at a particular moment in time. The particular moment where time 0 aligns with the time line of FIG. 3 and the particular contents of the FIFO at that moment in time may vary significantly depending on specific circuit and performance characteristics, as is understood by one skilled in the art. The illustration is of only one possible situation, but the general concept is that the indicated packets are loaded or are to be loaded at approximately the indicated times.

The packet also may contain a data payload 36, typically an address of the memory location that is to be transmitted. The payload may contain various other pieces of information typical of such transmissions. These details are spelled out in the O-HCI specification, particularly in section 9, and in the 1394-1995 specification and the principles are well understood by those skilled in the art.

The description above is for a system which is well understood by those skilled in the art. However, this system without more becomes prone to cycle loss as system speeds increase. This is particularly true if a designer attempts to use the smallest possible FIFO'S. FIFO's are expensive in terms of silicon area, power, and other factors, so it is desirable to use a moderately small FIFO. A FIFO, however, can be too small if it cannot hold a useful amount of data for transmission within the available time.

To further understand the problem, one skilled in the art recognizes that a 100 μsec burst of data at 100 MBS (megabits per second) can include up to 1K of data, but at 200 MBS that same 100 μsec burst can transmit 2K of data and at 800 MBS up to 8K of data. It is desirable to maintain two cycles of data in the transmit FIFO. A 16K FIFO is expensive and non-trivial to manage so any methods that allow use of smaller FIFOs are highly valued.

A useful way to manage isochronous FIFO's to fill them efficiently but not require unduly large FIFO's would be of considerable benefit in the industry.

SUMMARY OF THE INVENTION

This invention describes a method for the loading and unloading of a FIFO in an isochronous transmission mechanism that uses descriptor blocks which have both branch addresses and skip addresses. The method that is described can recover from cycle loss by selectively resending or skipping a packet that should have been sent in the lost cycle. The method that is described also works two cycles ahead of schedule, in an attempt to keep the FIFO loaded with all of the packets for two cycles of transmission, in order to maximize the chance of successful transmission.

The FIFO is filled according to a DMA algorithm and drained according to a Link algorithm where the two algorithms are coordinated to communicate information about lost cycles and current demands or opportunities for transmission. If the Link algorithm detects a lost cycle, it communicates that to the DMA algorithm and the DMA algorithm seeks to compensate appropriately.

These two algorithms describe mechanisms for the DMA and Link sides of an isochronous transmitter. Working in parallel, these two units can transmit isochronous packets on a serial bus, with two-cycle workahead, while supporting various recovery mechanisms for dealing with cycle loss. Each of the isochronous channels being transmitted by this system can use the recovery mechanisms, chosen as appropriate to best satisfy application-specific requirements.

It is one object of the present invention to manage a transmit FIFO to maximize the opportunity to successfully transmit useful information within an allocated time window.

This and other objects and advantages of the invention, as well as the details of an illustrative embodiment, will be more fully understood from the following specification and drawings.

DESCRIPTION OF THE PREFERRED EMBODIMENTS

Starting with the general architecture and methods described above in the background section, the following description is directed to one preferred implementation of the present invention. One skilled in the art will appreciate that other implementations and methods may be useful and still come within the teachings of this invention.

This invention describes a method for the loading and unloading of a FIFO in an isochronous transmission mechanism that uses descriptor blocks which have both branch addresses and skip addresses. The method that is described can recover from cycle loss in both of the previously described manners. The method that is described also works two cycle ahead of schedule, in an attempt to keep the FIFO loaded with all of the packets for two cycles of transmission, in order to maximize the chance of successful transmission.

Figure 5:
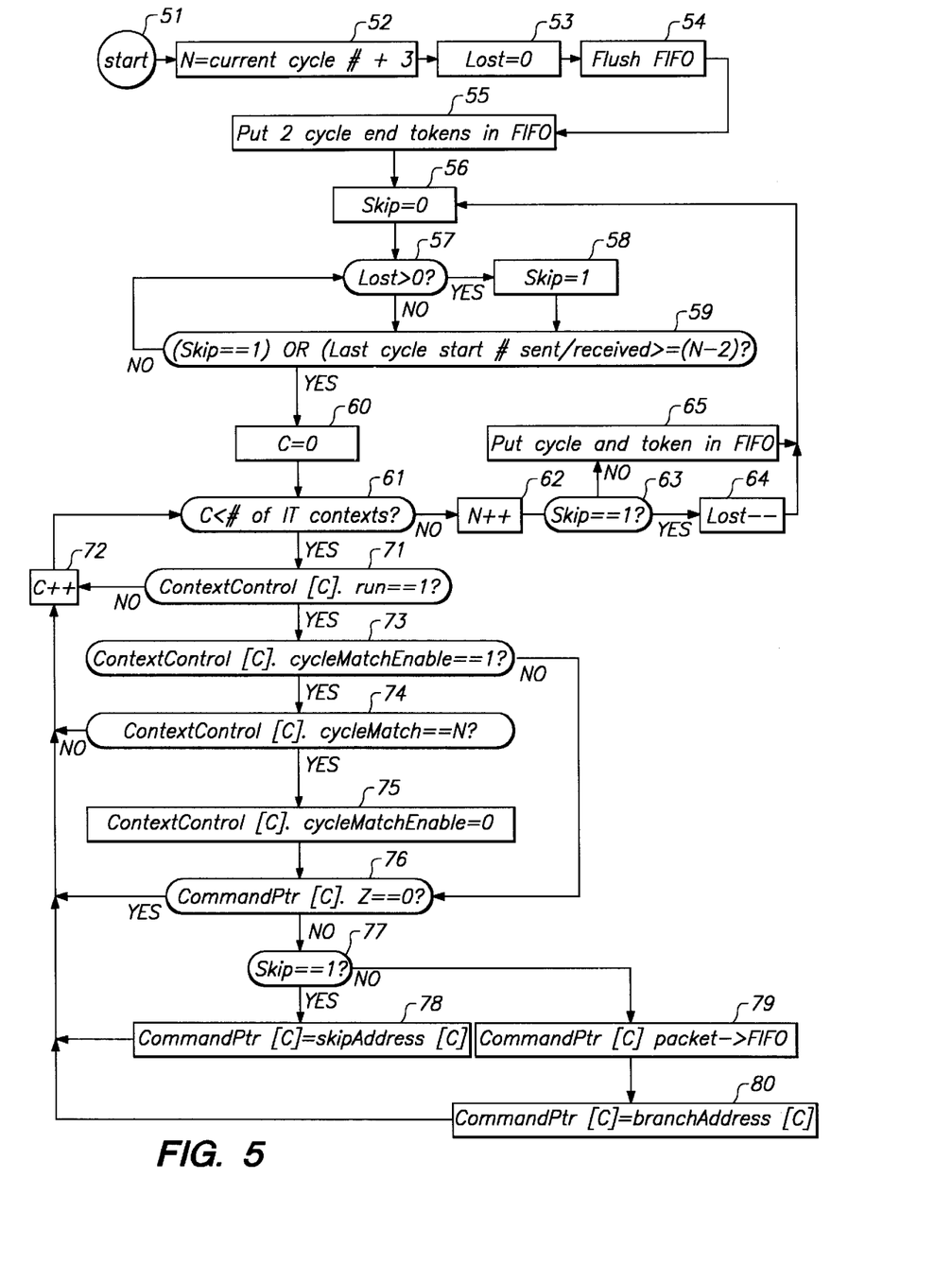
FIG. 5 illustrates a flow chart showing management of loading a FIFO, on the DMA side of the Isochronous Transmit DMA.
Figure 6:
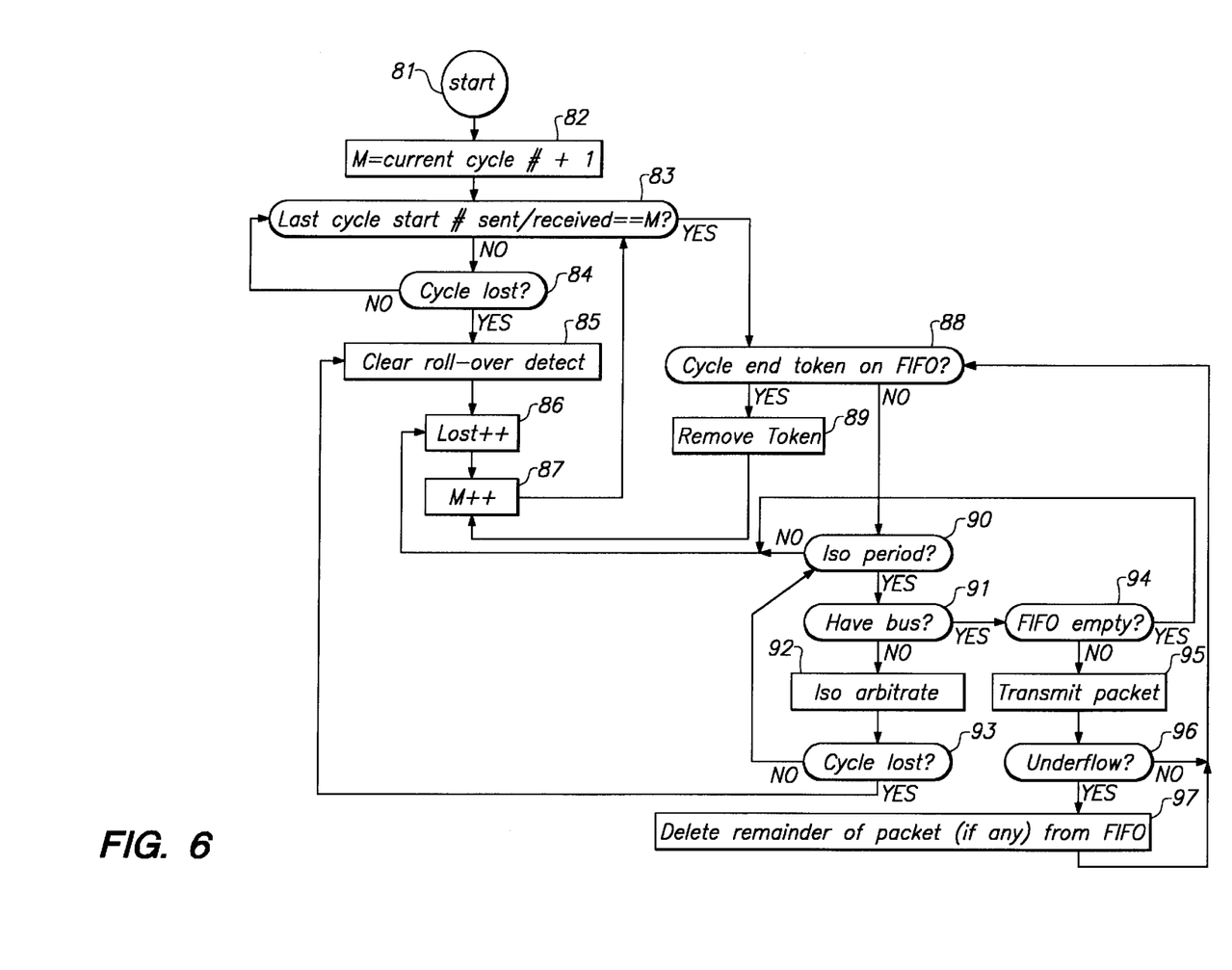
FIG. 6 illustrates a flow chart showing management of unloading a FIFO and transmitting packets, on the Link side of the Isochronous Transmit DMA.

Referring now to FIG. 5 and 6, the methods of this invention are illustrated in the figures titled "DMA side of ITDMA" (FIG. 5) and "Link side of ITDMA" (FIG. 6), where IT stands for isochronous transmit. The DMA side and the Link side communicate through the FIFO (illustrated in FIG. 1) and a single shared register called "Lost" (57A in FIG. 1, see also steps 53, 57, 64, 86). This register contains a count of the number of cycles that have been reported as lost by the Link side that the DMA side has not yet compensated for. The FIFO is used mostly to contain the packets that are to be transmitted, but it also contains information marking the boundary of the packets and the boundary of each isochronous cycle.

Referring to FIG. 5, the flow chart for the DMA side contains two major loop structures. The top portion of the flow chart is used to synchronize the DMA side with the isochronous cycles. The DMA will attempt to begin work on a particular isochronous cycle two cycles ahead of time, so that ample time will exist to load data into the FIFO. However, because the FIFO may not be big enough to hold two full cycles worth of data, the DMA side may not always be working two cycles ahead of schedule.

The bottom portion of the flow chart shows the processing of each isochronous channel that is to be transmitted. When the DMA enters the bottom portion of the flow chart, it intends to either transmit one packet, as described by one descriptor block, for each active channel, or to skip one descriptor block for each active channel. If packets are being transmitted, the DMA will follow the branch address of the descriptor block of each active channel. If packets are being skipped, the DMA will follow the skip address of the descriptor block of each active channel. Once the DMA has processed each active channel, it will return to the top portion of the flow chart, to await synchronization so that it may begin processing the next cycle. The flow chart illustrated contains additional mechanisms to support the "run" and "cycleMatch" features of the isochronous transmit DMA mechanism used in the 1394 OpenHCI interface, for purposes of example.

In more detail, steps 51, 52, 53, 54 and 55 are part of an initialization sequence. In step 52, "current cycle #" is maintained in a clock private to the link circuit and is synchronized with a system clock. N is a local counter and stores the present cycle number trying to be loaded into the FIFO. This number should preferably be zero to two cycles ahead of the cycle currently being sent. Steps 53 and 54 initialize the "Lost" register 57A and FIFO 5. Lost functions as a shared variable so the output algorithm for the FIFO can signal the input algorithm that one or more cycles have been lost. Step 55 initializes the FIFO 5 to include two cycle end tokens, which will by used to synchronize the data input and withdrawal from the FIFO. Steps 56 through 60 synchronize and tell this algorithm when to get another cycle's worth of data. Skip is a local variable and tells this algorithm whether to send packets or follow skip branches for one cycle's worth of packets. If Lost is greater than 0, then skip processing can be performed immediately so in 58 Skip is set to 1, which will force the decision in step 59 to "yes". If Lost is equal to 0 (the preferred and hopefully normal condition), then the test of step 59 is performed. In 59, if Skip is not equal to "1", then the value of the last cycle start number sent or received (stored in a local variable or register) is compared to N−2. Until that cycle start number is greater than or equal to N−2, the routine loops to step 57. Ultimately either a cycle is lost (Lost increments) or, in the normal course of events, a cycle start is sent or received such that the comparison is greater to or equal to 2 (i.e., the FIFO will contain less than two complete cycles) and the comparison succeeds and the algorithm proceeds to process data to fill the FIFO or skip.

In the bottom portion of the algorithm, an internal counter C is initialized in step 60. In step 61 that counter is tested to see if it is smaller than the number of contexts, which corresponds to the number of channels to be transmitted by that port. For example, in FIG. 3, two channels are illustrated. According to the O-HCI specification, section 1.3.2, a minimum of four contexts and a maximum of 32 are to be supported. On the initial pass, if there are any contexts, this condition will be true. in step 71, the run bit of the ContextControl register for context C is tested. If it is true, then that context is enabled for processing. See O-HCI specification section 3.1.1 for a general description of the ContextControl register and section 3.1.1.1 for a description of the run bit. In steps 73, 74 and 75, the cycleMatch enable status is checked and if set and the cycleMatch value is equal to the current cycle to be loaded, the cycleMatch Enable is toggled and execution proceeds. If cycleMatch Enable is not set, control passes directly to step 76.

In step 76, the Z field of the CommandPtr register is tested for a non-zero status. If the Z field (33 in FIG. 3) is zero, this indicates that this is the end of the program. See generally section 7.1.5.1 of the O-HCI specification, describing Z value encoding. According to the O-HCI specification, section 3.1.2, a Z=0 value indicates that the descriptorAddress (the largest field (34 in FIG. 3) in CommandPtr and a pointer to the next instruction is not valid. If this is not the end of the program (i.e. Z is non-zero), then in step 77 the Skip setting is tested. If it is true and a skip is required then in step 78 the SkipAddress for that context is loaded into the corresponding CommandPtr. If no skip is required, then control passes to step 79 and the packet indicated by CommandPtr[C] is loaded into the FIFO. This is by far the most time consuming of any of the steps in this cycle and can take up to about 250 μsec. This is true since the FIFO is generally full and therefore contains packets for two pending cycles. It is of course preferable that this take much less time so as to allow for processing of packets from other contexts if possible.

Finally, in step 80, the next branch address is loaded into the Command Pointer for that context. From here, and from several other points discussed above and shown in the figure, namely from steps 71, 74, 76, and 78, control passes to step 72 where C is incremented and tested again in step 61 to see if any contexts remain in the current cycle. The loop of 71 through 72 via the relevant tests and steps 73 through 80 is repeated until all contexts for the current cycle have been processed. The test of step 61 is now satisfied and in 62 N is incremented. If this is a Skip processing cycle (step 63) then the Lost value is decremented (step 64) but if not then a cycle end token is put into the FIFO (step 65) and control returns to step 56 for initial testing then holding in loop 57 (→58)→59 until the test of step 59 is true and another cycle is processed as described above.

Referring to FIG. 6, the Link algorithm shows how packets are removed from the FIFO and transmitted on the serial bus. Like the DMA algorithm, the top portion of the link side of the flow chart waits for synchronization so that it can begin work when a cycle starts. Then it enters the bottom portion of the flow chart, where it removes packets from the FIFO and transmits them on the serial bus. If while waiting for a cycle start or while transmitting packets, the Link side detects a lost cycle, it will communicate this event to the DMA side by incrementing the shared register Lost. The Link side will then continue to attempt to transmit packets.

These two flow charts describe mechanisms for the DMA and Link sides of an isochronous transmitter. Working in parallel, these two units can transmit isochronous packets on a serial bus, with two-cycle workahead, while supporting two recovery mechanisms for dealing with cycle loss. Each of the isochronous channels being transmitted by this system can use either of the two recovery mechanisms, chosen as appropriate to best satisfy application-specific requirements.

In more detail, steps 81 and 82 are part of an initialization sequence. M is a local counter and stores the present cycle number which is to be sent (or being sent) on the bus. In general, M should be the current cycle or the previous cycle ("one behind"). M is initialized to the current cycle number plus one. Note that this is two behind the starting value of N maintained in the IT DMA routine of FIG. 5. In step 83, the number of the last cycle start sent or received is tested against M. If it is not equal, then it is not yet time to start a transmission cycle. In step 84, a test for a lost cycle is interposed. In one preferred embodiment, this involves counting cycle starts. An internal counter monitors times when cycle starts are expected to be detected (sent or received over the serial bus). If that internal counter ticks twice and no cycle starts have been detected, then a cycle start has been lost. In this case, in steps 85, 86, 87 the roll-over detect toggle is reset, the shared Lost counter is incremented and the value of M is incremented. Control returns to step 83. The increment of the Lost counter is used by the DMA input algorithm to adjust the selection of information being assembled for the FIFO.

When step 83 is successful, control passes to step 88. If a cycle end token is found on the FIFO, the token is removed (step 89), M is incremented (step 87) and control returns to step 83. The next test is in step 90 to see if the current cycle time is within the "iso time" or isochronous transmit period. If not and if there is information waiting to be sent, then it must wait until the next isochronous period and a cycle has been or soon will be lost. The iso period may end because of a bus reset, FIFO underflow, or other special condition. It is possible but unlikely that the iso period may end because the allocated time simply has passed, but the bus manager should guarantee that each allowed isochronous channel has guaranteed time to send. Control returns to step 86. In FIG. 2, if packet A1B1 was ready to go in cycle 1 but for some reason was unable to be sent, perhaps due to a reset on the bus, A1B1 19 will be sent in cycle 2. The Lost cycle counter will prompt the DMA filling algorithm to skip a relevant cycle to realign the data.

If the iso period is active, the next test is for rights to the bus. This is generally required for the first pass during a cycle and generally not required for sending the second, third, etc. packets during a single cycle since the bus grant is expected to be maintained for transmitting all relevant contexts. In step 91, the presence of a bus grant is tested and, if lacking, in step 92 arbitration for the bus is undertaken. In step 93 a test for a lost cycle is interposed. As described above for step 84, in one preferred implementation, the cycle start timer is again checked for a double rollover and, if found, returns to step 85 and continues as described above. If no cycles have been lost, control returns to step 90 to see if an iso period is still active. If so, and if the bus grant from the arbitration is still valid as expected after initial arbitration during a cycle, control passes to step 94. If the FIFO indeed is completely empty, control returns to step 86 and the cycle is treated as a lost cycle (no information transmitted, presumably due to failure to supply data to the FIFO). In the usual case, the FIFO will contain data and in step 95 a packet is transmitted. The process of transmission is discussed in detail in the 1394-1995 specification and is well known in the art. If, during the course of transmitting the packet, the FIFO becomes empty, then an underflow condition is detected in step 96 and the remainder of the packet, if any, is deleted from the FIFO in step 97 and control returns to step 88. If there is no underflow and the packet is transmitted successfully, control returns to step 88. The sequence repeats to transmit all packets in the FIFO until a cycle end token is found in the FIFO, at which point control passes through 89, 87, 83 to remove the token, increment M and prepare for the next cycle as described above.

An underflow condition may occur when the FIFO is being drained faster than it is being filled and the end of the available data reaches the front of the FIFO. This may occur in an instance where the algorithm of FIG. 5 cannot access data fast enough or soon enough, and is a potential danger whenever the FIFO is being drained and filled simultaneously with no intervening cycle end packets. Another potentially problematic situation occurs when a data packet is particularly large and may, for example, exceed the capacity of the entire FIFO so that a hand-to-mouth filling/draining sequence cannot be avoided. If an underflow is detected, this preferably should signal a cycle loss only if additional data was in the FIFO, or queued for the FIFO, and could not be transmitted.

For example, referring to FIG. 7, this illustrates the contents of the FIFO 5 at time 0 ($t_0$) 5-0 and at time 1 ($t_1$) 5-1. The sequence of A1B1, Cycle end token (CET), A2B2, CET is typical and might occur for example at approximately the beginning of time period 1 in FIG. 2. Packet A3, not shown in FIG. 2, may be as large as or even larger than FIFO 5 so that it will be only partially loaded at time $t_1$. As the packet begins to be transmitted, for example at some time before time $t_2$, the DMA filling algorithm continues to transfer data into the top of the FIFO. If conditions are right, the filling sequence will be sufficiently ahead of the transmission sequence so that the complete packet can be transmitted successfully. However, if this hand to mouth sequence is too slow, for example because of some competing demands for host system resources, an underflow situation can occur when there is no valid data in the FIFO, and the transmission of the packet will fail. An underflow can occur in much smaller packets as well, but this illustrates one potential problem.

Figure 8A:
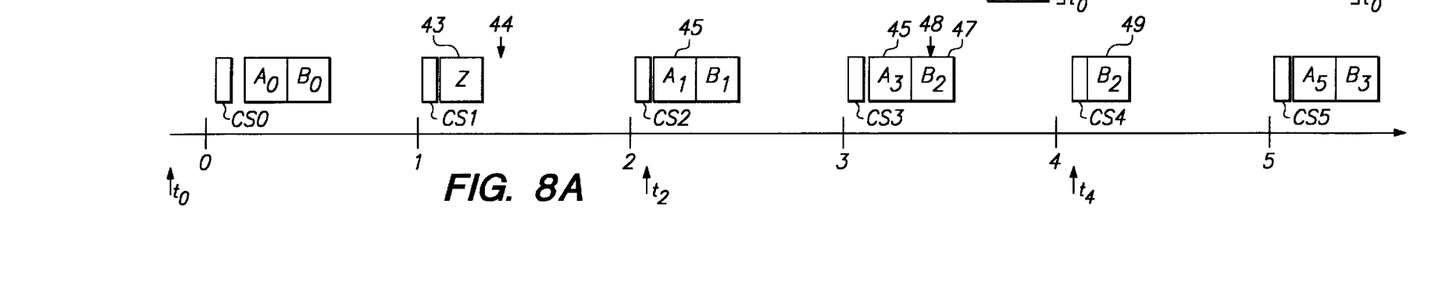
FIG. 8A illustrates a timeline for a third, representative transmission sequence.
Figure 8B:
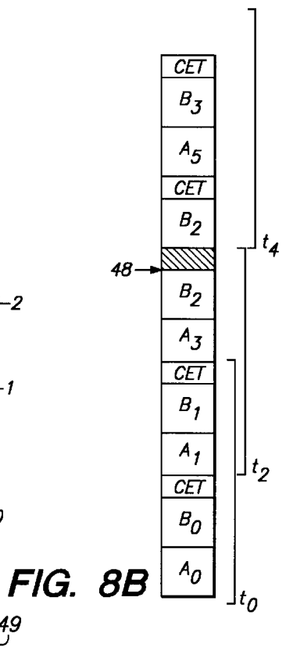
FIG. 8B illustrates representative contents of the FIFO for the third, representative transmission sequence of FIG. 8A.

Referring now to FIG. 8A and FIG. 8B, some of the effects of possible actions can be seen. FIG. 8B illustrates one possible set of contents of the FIFO with the brackets reflecting the approximate contents of the FIFO at approximately the times noted. As described above in relation to FIG. 3, this is only an approximation to assist in understanding the invention.

In cycle 0, a normal cycle start CS0 is detected and packets A0B0 are transmitted normally. In cycle 1, a packet Z 43 from another node is transmitted normally but a reset 44 occurs before packet A1 can be sent. The FIFO still contains packets A1B1 which cannot be transmitted because there is no isochronous transmit period in time period 1 after the reset event. In FIG. 6, step 90 tests negative and step 86 registers the lost cycle. In step 57 of FIG. 5, Lost is now greater than 0, so the skip flag is set in step 58 and the process continues. In step 77, skip is set, so the skipAddress value is loaded into CommandPtr. If the skip instructions are set to maintain time accuracy, then some number of packets will be skipped. For example, the packet may be dropped so that the next packet to transmit for channel A is A3, skipping A2. However, if the skip instructions are set to maintain complete data transmission, the next packet, A2, will simply be retransmitted. Note that the channels may well be independent in the nature of skip settings. For purposes of this example, channel A is taken to be time sensitive and channel B is taken to be content sensitive. Since the skip instructions in channel B are selected to guarantee sending every packet, the next B packet, B2, is simply resent.

Recovering from the lost cycle, A1 and B1 are transmitted at the next opportunity, in time period and cycle 3. According to the skip instructions, the DMA unit fills the FIFO with the next A packet, A3 (skipping A2) and the next B packet, B2. For purposes of example, a second event at 48 prevents proper transmission of that cycle. This might be an underflow condition so that packet B2 is not transmitted properly. This causes execution to follow steps 96, 97, 88, 90, 86, 87, 83. The Lost cycle is detected in step 57, setting the skip flag in 58 and execution follows steps 59, 60, 61, 71, 73-77, 78, 72, 61 . . . 62, 63, 64, 56, 57, 59, 60, 61, 71 . . . 77, 79, 80, 72, 61, 62, 63, 65, 56 so the skip value for channel B is tested (resend in this example), and the sequence is processed to get to step 79 and send the desired B2 packet, followed by an end of cycle token (step 65) to the FIFO. The packet is transmitted in time period and cycle 4 (packet 49) and the end of cycle token is removed in step 89 and processing continues. On the next fill cycle (which takes place during time periods 3 and/or 4 depending on the specific timing of events), packets AS (skipping again to maintain time alignment) and B3 (next packet in sequence, maintaining content) are loaded, then transmitted during time period and cycle 5. Many other examples can be tested and one skilled in the art will understand how the present algorithm provide an advantageous fill and transmit sequence.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A method for loading a FIFO comprising:

initializing a FIFO by loading two cycle end tokens, setting a skip variable to a first state to indicate normal operation, setting the value of a counter variable to indicate normal operation;

monitoring the number of the last cycle transmitted or received;

monitoring the number of the last cycle of information written to the FIFO, comparing said number of the last cycle received or transmitted to the number of the last cycle of information written to the FIFO, if said comparison shows a difference of less than two then getting the next values and writing them to the FIFO, checking the settings of a context control register to identify if data is available to be written to the FIFO, loading a FIFO if the values of the registers so indicate, and returning to said comparing step.

2. The method of claim 1 further comprising after said step of check settings, testing for a branch condition and if a first condition is found, loading a first instruction to be examined next and if a second condition is found, loading a second instruction to be examined next.

* * * * *